United States Patent
Essig et al.

(10) Patent No.: US 11,234,352 B2
(45) Date of Patent: Feb. 1, 2022

(54) BLADE TIP AND TOOL COMBINATION HAVING A BLADE TIP

(71) Applicant: Betek GmbH & Co. KG, Aichhalden (DE)

(72) Inventors: Wolfgang Essig, Rosenfeld (DE); Ulrich Kraemer, Wolfach (DE); Florian Smeets, Dossenheim (DE); Fabian Seifried, Herrenzimmern (DE); Ruth Huber, Schramberg (DE)

(73) Assignee: Betek GmbH & Co. KG

( * ) Notice: Subject to any disclaimer, the term of this patent is extended or adjusted under 35 U.S.C. 154(b) by 579 days.

(21) Appl. No.: 15/594,945

(22) Filed: May 15, 2017

(65) Prior Publication Data
US 2017/0325392 A1    Nov. 16, 2017

Related U.S. Application Data

(63) Continuation of application No. PCT/EP2015/076437, filed on Nov. 12, 2015.

(30) Foreign Application Priority Data

Nov. 13, 2014  (DE) .................. 10 2014 116 618.3

(51) Int. Cl.
*A01B 15/02*    (2006.01)
*A01B 23/02*    (2006.01)

(52) U.S. Cl.
CPC .............. *A01B 15/02* (2013.01); *A01B 23/02* (2013.01)

(58) Field of Classification Search
CPC ........ A01B 15/02; A01B 23/02; A01B 35/225

USPC ......................................... 172/753
See application file for complete search history.

(56) References Cited

U.S. PATENT DOCUMENTS

| 223,309 A * | 1/1880 | Beebe ............ A01B 15/06 172/753 |
| 558,098 A * | 4/1896 | Park ................ F16B 2/185 403/110 |
| 1,838,355 A * | 12/1931 | Benjamin ......... A01B 35/225 403/97 |

(Continued)

FOREIGN PATENT DOCUMENTS

| DE | 36 28 910 C2 | 3/1994 |
| DE | 10 2011 102 053 A1 | 11/2012 |

(Continued)

OTHER PUBLICATIONS

Canadian Office Action (Application No. 2,967,887) dated May 22, 2018.

*Primary Examiner* — Thomas B Will
*Assistant Examiner* — Joel F. Mitchell
(74) *Attorney, Agent, or Firm* — Lucian Wayne Beavers; Patterson Intellectual Property Law, PC (57) ABSTRACT

A blade tip, and a tool combination having a blade tip, for an agricultural soil cultivation machine. The blade tip has a base part including a cutter, a cutter carrier, a guiding element and a receptacle for fastening the blade tip to a tine of the agricultural soil cultivation machine. The base part has a receptacle covered by covering portion. The guiding element has a plug attachment held in the receptacle, and a form-fitting connection preventing movement of the guiding element out of the receptacle, provided between the blade tip and the guiding element.

20 Claims, 7 Drawing Sheets

(56) References Cited

U.S. PATENT DOCUMENTS

| | | | | |
|---|---|---|---|---|
| 3,999,614 | A * | 12/1976 | Rhoads | E02F 9/2875 |
| | | | | 172/719 |
| 4,867,248 | A * | 9/1989 | Robertson et al. | A01B 15/025 |
| | | | | 172/753 |
| 6,315,057 | B1 * | 11/2001 | Borter | A01B 35/225 |
| | | | | 172/753 |
| 6,490,816 | B2 * | 12/2002 | Ketting | E02F 9/2858 |
| | | | | 37/454 |
| 6,585,058 | B2 * | 7/2003 | Zaun et al. | A01B 35/225 |
| | | | | 172/750 |
| 2016/0014950 | A1 | 1/2016 | Smeets | |

FOREIGN PATENT DOCUMENTS

| | | |
|---|---|---|
| WO | 2007/091933 A1 | 8/2007 |
| WO | 2014/139733 A2 | 9/2014 |

\* cited by examiner

BLADE TIP AND TOOL COMBINATION HAVING A BLADE TIP

CROSS REFERENCE TO RELATED APPLICATIONS

This application is a continuation of International Application No. PCT/EP2015/076437 filed Nov. 12, 2015, which designated the United States, and claims the benefit under 35 USC § 119(a)-(d) of German Application No. 10 2014 116 618.3 filed Nov. 13, 2014, the entireties of which are incorporated herein by reference.

FIELD OF THE INVENTION

The present invention relates to a blade tip for an agricultural soil cultivation machine, having a base part, having a cutter on a cutter carrier, the base part having a screw receptacle for fastening to a carrier, in particular, a tine of the agricultural soil cultivation machine.

The present invention also relates to a tool combination with a blade tip for an agricultural soil cultivation machine, the blade tip having a base part, having a cutter on a cutter carrier, and a guiding element attached to the blade tip, the blade tip having a screw receptacle for fastening to a tine of the agricultural soil cultivation machine.

BACKGROUND OF THE INVENTION

DE 10 2011 102 053 A1 discloses a tool combination, having a blade tip and a guide plate, which can be mounted together on a tine of a soil cultivating machine. The blade tip has a cutter carrier at a cutting end, which is equipped with a cutting element made of hard metal. On the side of the cutting element, secondary cutters are soldered to the cutter carrier. The cutter carrier has a screw receptacle, which can be aligned flush with a screw receptacle of the guide plate. The guide plate is placed onto the blade tip and covers the surface regions adjacent to the cutter and the secondary cutters. To fasten the combination, consisting of guide plate and blade tip, a fastening screw is inserted on the front side through the mutually aligned screw receptacles of the guide plate and the blade tip and screwed into a screw receptacle of the tine. Under harsh conditions of use and difficult ground conditions, the guide plate may bend with respect to the blade tip and peel off. As a result, the functionality of the tool combination is, at the least, significantly impaired.

SUMMARY OF THE INVENTION

It is an object of the present invention to provide a blade tip of the type mentioned above or a tool combination with a blade tip that permits a secure fixing of the guiding element and blade tip to a tine or similar carrier of an agricultural soil cultivation machine.

The object of the present invention with regard to the blade tip is solved by the base part having a receptacle, which is covered in the tool feed direction (V) by means of a covering portion, for fixing a plug attachment of a guiding element, which is insertable into the receptacle, and by the receptacle having at least one form-fitting element to form a form-fitting connection with at least one form-fitting counter element, attached to the plug attachment, such that movement of the guiding element out of the receptacle is prevented. The covering portion protects the guiding element in the region of the receptacle from attack by the soil material removed by the blade tip. In particular, the guiding element can then no longer bend or twist against the blade tip at its free end, ensuring sustained functionality. Due to the form-fitting connection, the guiding element is securely attached to the blade tip. With appropriate design of the form-fitting element and the form-fitting counter element, large exerted forces can be absorbed.

According to a preferred embodiment of the present invention, it can be provided that the receptacle is opened towards a rear side of the blade tip opposite the tool feed direction (V), that the receptacle is opened by means of a receptacle opening towards a front face of the base part opposite the cutter, and that the receptacle is enclosed by side walls extending from the covering portion to the side of the receptacle opening. As a result, the guiding element is housed laterally and protected and can be inserted into the receptacle through the receptacle opening.

As a result, a secure form-fitting connection, and, at the same time, simple mounting, can be achieved by the at least one form-fitting element being attached or formed on a surface that delimits the covering portion from the receptacle and/or on a side wall of the receptacle. During assembly, the blade tip with its receptacle can be pushed over the plug attachment in such a way that the form-fitting element on the receptacle engages with the form-fitting counter element on the plug attachment and is then connected to the carrier by a screw connection.

According to one embodiment of the present invention, it can be provided that the at least one form-fitting element is formed by at least one attachment projecting into the receptacle from the covering portion or a side wall and/or by at least one recess introduced into the covering portion or a side wall. The tolerance of the dimensions of the attachment and the receptacle here are such that the plug attachment can be easily inserted into the receptacle. In addition to preventing movement of the guiding element out of the receptacle, the attachment projecting into the receptacle also prevents twisting of the guiding element with respect to the blade tip.

A further possible embodiment of the present invention provides that the at least one form-fitting element is formed by at least one region of the receptacle tapering in the direction of the receptacle opening. Thus, the width and/or the height of the receptacle in the inner region can be larger than the height or width in the direction of the receptacle opening. A plug attachment with a correspondingly shaped form-fitting counter element is thus held securely in the receptacle.

If it is provided that at least one form-fitting element is designed as a centering attachment or as a centering receptacle and/or that the at least one form-fitting element is designed as a ball attachment or as a ball receptacle, self-centering of the components is achieved when the blade tip and the guiding element are joined together, so that, for example, screw receptacles to receive screws for attaching the blade tip and the guiding element to the carrier are in alignment. Due to the spherical shape, the form-fitting element and form-fitting counter element can be easily inserted into one another.

The form-fitting connection is designed to absorb forces that pull the guiding element from the receptacle of the blade tip in the direction of its longitudinal extension and the longitudinal extension of the blade tip. If it is provided that the covering portion has a second screw receptacle, or that the covering portion has a second screw receptacle and that the second screw receptacle is guided by the at least one form-fitting element, forces acting transversely to the longitudinal extension of the blade tip and the guiding element can be absorbed as well. By means of the second screw receptacle, a screw connection can be established between the blade tip, the guiding element, and the carrier. If this screw connection is guided through the at least one form-fitting element, the form-fitting element and the form-fitting counter-element are directly compressed by the screw and held in position with respect to one another so that the form-fitting connection is maintained even under high shear forces.

According to a particularly preferred embodiment of the invention, it can be provided that the second screw receptacle is designed in the manner of a blind hole with an end aperture for inserting a fastening screw. Due to the blind-hole-like design of the screw receptacle, a screw head of the fastening screw can be arranged recessed. The screw head is thus protected against abrasive wear caused by the passing soil.

For assembly, a mounting screw is inserted through corresponding screw receptacles and bores of the blade tip, the guiding element, and the tine, and is secured with a screw nut on the rear. In this case, the screw head is held, for example, sunk in the depression of the step bore. In order to be able to easily mount the screw nut, it may be provided that the opening of the second screw receptacle is designed as a screw lock for non-rotatable affixing of the inserted fastening screw, in particular, that the opening is designed in a shape other than a round cross-section, in particular, in a rectangular or substantially rectangular shape. Adjoining the screw head, the fastening screw has a corresponding counterpart with a shape corresponding to the screw lock, for example, a substantially rectangular attachment that engages into the screw lock and thus prevents the turning of the fastening screw. The screw nut can thus be turned and tightened onto the fastening screw without the fastening screw having to be countered by means of a tool to be attached to the screw head. The screw head can furthermore be designed with a smooth surface without a tool receptacle, for example, in the form of a cross slot, internal hexagon or the like. The fixation of the fastening screw by the screw lock also simplifies disassembling the blade tip since no tool needs to be inserted into a tool receptacle of the screw head. The fastening screw can thus also be easily removed even when the tool receptacle or the step bore is plugged with soil by the opening screw nut and driving the fastening screw out of the screw receptacles and bores.

According to a particularly preferred embodiment, a blade tip can be formed such that the receptacle is delimited laterally by two blocking pieces as side walls, arranged at a distance from each other transversely to the tool feed direction (V), and/or that the two blocking pieces' transition into two insertion chamfers, spaced apart from one another, towards the receptacle opening. The guiding element can be enclosed between the two blocking pieces. The blocking pieces here form contact surfaces for the guiding element. By means of the blocking pieces, the guiding element and the blade tip can thus be held against one another transversely to the tool feed direction, achieving a reduction in the required number of fastening means, in particular, fastening screws. If the blocking pieces are integrally connected by a connecting portion, further stabilization of the blocking pieces may be achieved. This allows for reliable absorption of transverse forces. The insertion chamfers serve for simple assembly.

A guide of the guiding element in the receptacle that is resistant both transversely and longitudinally to the direction of insertion can be achieved by the form-fitting element being arranged at least partially between the blocking pieces and the blocking pieces are spaced apart in a range between 40 mm and 50 mm, preferably in a range between 44 mm and 48 mm, particularly preferred 46 mm, and/or that the insertion chamfers, extending from the blocking pieces, are arranged with a reciprocal opening angle in a range between 50° and 70°, preferably in a range between 58° and 62°, particularly preferably 60°. Due to the distance between the blocking pieces and the form-fitting element thus achieved, the guiding element can also be designed with a sufficiently great material thickness in this region in order to withstand the high mechanical loads during soil cultivation. The opening angle of the insertion chamfers ensures that the blade tip can simply be pushed onto the guiding element during assembly. Furthermore, the cross-section, and thus the material thickness of the guiding element, can be increased towards the front-side opening of the receptacle such that a correspondingly high mechanical resilience of the guiding element is achieved at the opening of the receptacle in the region which is particularly subjected to bending loads.

A blade tip according to the present invention can be designed such that a projection, which protrudes over a deflecting surface, is associated with the screw receptacles and/or the second screw receptacle in front in the tool feed direction (V), and/or that the screw receptacle and/or the second screw receptacle each have a recess into which one screw head each of an inserted fastening screw can be introduced, offset from the deflecting surface. The projection serves as a deflector for the soil material and guides it away from a screw head mounted in the respective screw receptacle. Due to the design of the screw receptacles in the form of stepped bores with corresponding recesses, the soil is prevented from passing directly by the screw heads during soil cultivation. Due to these measures, the screw heads are positioned to be protected against wear.

The object of the present invention with respect to the tool combination is solved by the base part having a receptacle, which is covered by a covering portion the tool feed direction (V), the guiding element having a plug attachment that is held in the receptacle, and a form-fitting connection being operative in the region of the receptacle between the blade tip and the guiding element, preventing movement of the guiding element out of the receptacle. The guiding element is thus securely housed with its free end behind the covering portion. The plug attachment inserted into the receptacle and the blade tip are resilient due to the form-fitting connection, but are again releasably connected to each other. The form-fitting connection ensures the correct alignment of the blade tip with the guiding element, and thus the screw receptacles with respect to one another. As a result, a fastening screw can simply be inserted through the screw receptacles and the blade tip, along with the guiding element, can be connected to the tine.

According to a particularly preferred embodiment of the present invention, it can be provided that the receptacle is opened towards a rear side of the blade tip opposite the tool feed direction (V), that the receptacle is opened towards a front side of the base part opposite the cutter by means of a receptacle opening, that the receptacle is enclosed on the side of the receptacle opening by side walls, projecting from the covering portion, that the plug attachment of the guiding element is inserted into the receptacle through the receptacle opening, that at least one form-fitting element is attached or formed on a surface delimiting the covering portion from the receptacle and/or on a side wall of the receptacle, and that the plug attachment has at least one form-fitting counter-element corresponding to the form-fitting element. For assembly, the blade tip with its receptacle can be pushed on the plug attachment with its rear opening. The form-fitting element and the form-fitting counter element then engage with each other and form the form-fitting connection. The guiding element is guided out of the receptacle through the receptacle opening. In this position, the blade tip can be affixed with respect to the guiding element and the carrier by at least one corresponding screw connection. The form-fitting connection prevents movement of the guiding element out of the receptacle opening. The side walls lead to a lateral guide of the plug attachment, and thus of the guiding element in the receptacle, so that the connection withstands even high mechanical loads on the blade tip and the guiding element.

An easy-to-manufacture, easy-to-assemble, and resilient form-fitting connection can be achieved by the at least one form-fitting element being formed by at least one attachment projecting into the receptacle from the covering portion or a side wall and/or by at least one recess inserted into the covering portion or a side wall, and by the at least one form-fitting counter element engaging into the recess or the attachment engaging in at the least one form-fitting counter element. The attachment and the corresponding recess can be designed in many forms, for example, as cylindrical or rectangular trunnions or as rib-like projections with the correspondingly shaped recesses. The form-fitting element and the form-fitting counter-element are advantageously integrally formed on the blade tip or the plug attachment. The mechanical resilience of the form-fitting connection can be increased by providing multiple attachments with corresponding recesses.

A particularly resilient form-fitting connection can be achieved by the at least one form-fitting element being formed by at least one region of the receptacle tapering in the direction of the receptacle opening and by the at least one form-fitting counter element being formed by at least one region of the plug attachment tapering in the direction of the receptacle opening.

An exact alignment of the guiding element with respect to the blade tip can be achieved by the at least one form-fitting element being designed as a centering attachment and that at least one form-fitting counter element being designed as a centering receptacle or by the at least one form-fitting element being designed as a centering receptacle and that at least one form-fitting counter element being designed as a centering attachment and/or the centering attachment being designed as a ball attachment or the centering receptacle being designed as a ball receptacle. The ball shape offers the advantage of simple assembly since a ball attachment centers itself in a corresponding centering receptacle without requiring the use of high force. The centering receptacle may also have a spherical shape, but may also have other shapes that may be more easily manufactured, such as a circular bore or a conical shape.

Particularly simple manufacturing of the form-fitting counter-element can be achieved by the at least one form-fitting counter element being designed as a bead formed into the plug attachment. The form-fitting counter element can thus be formed into the plug attachment, for example, by means of a press. As a result, complex machining steps may be avoided.

A mechanically highly resilient connection between the guiding element and the tine, as well as exact positioning of the guiding element with respect to the tine of the soil cultivation machine, can be achieved by the guiding element being connected to the tine and by providing an additional form-fitting connection in the boundary surface between the guiding element and the tine and/or by providing an additional form-fitting connection between the guiding element and the base part.

A continuous form-fitting connection between the tine, the guiding element, and the blade tip can be achieved by the base part of the blade tip having a form-fitting element in the region of the receptacle that engages into a form-fitting counter-element on the plug attachment of the guiding element and into a form-fitting counter-element of the tine, and/or by the plug attachment of the guiding element having a form-fitting element that engages into a form-fitting counter-element of the base part of the blade tip and into a form-fitting counter-element of the tine and/or the tine having a form-fitting element that engages into a form-fitting counter-element of the plug attachment of the guiding element and into the form-fitting counter-element of the base part of the blade tip.

High mechanical resilience of the composite of the blade tip, the guiding element, and the tines can be achieved by form-fitting locking of the blade tip and the guiding element transversely relative to the tool feed direction (V) by means of one or more locking pieces, and by form-fitting locking of the plug attachment and the guiding element into the receptacle relative to one another, in and against the insertion direction of the plug attachment, by means of the form-fitting element and the form-fitting counter-element. Forces acting both longitudinally and transversely with respect to the tool feed direction (V), can thus be absorbed by the form-fitting connections.

A particularly mechanically resilient connection between the blade tip, the guiding element and the tine can be achieved by the covering portion having a second screw receptacle, by an opening of the second screw receptacle being guided through the form-fitting element, by the plug attachment having a third screw receptacle, and by an opening of the third screw receptacle being guided through the form-fitting counter element. By means of the second screw receptacle and the third screw receptacle, the blade tip and the guiding element arranged underneath can be connected to the tines of the soil cultivation machine by a common fastening element. The form-fitting element and the form-fitting counter-element ensure correct alignment of the blade tip with the guiding element, as well as the form-fitting connection between the blade tip and the guiding element. By means of the screw connection, the form-fitting element and the form-fitting counter element are firmly pressed together so that they will not be separated even under high mechanical loads.

Secure locking of the blade tip against the guiding element can be achieved by the form-fitting element being designed as a ball attachment and/or by the form-fitting counter element being designed as a bore, in Particular, as a through-hole or as a blind hole or as a concavely-shaped recess or as a recess with straight and inclined surfaces with respect to a center axis of the form-fitting counter element. A through-hole or blind hole is easy to manufacture. If the through-hole or blind hole has the same or smaller diameter than the ball attachment, it is centered with respect to the through-bore when it is screwed together. By using a depression that is preferably concave, corresponding to the rounding of the ball attachment, as a form-fitting counter element, a large contact surface is advantageously achieved between the form-fitting element and the form-fitting counter element. As a result, the forces to be absorbed are distributed over a larger surface area, reducing the pressure and thus preventing deformations. A depression with straight and inclined surfaces is also easy to manufacture. In this case, the ball attachment is centered by the inclined surfaces. The depression can be part of a bevel bore, for example.

In order to connect the guiding element to the tine beyond the region of the receptacle, an additional screw connection can be provided between the guiding element and the tine. In order to protect a fastening screw used for this purpose from increased wear caused by passing soil, it may be provided that the covering portion forms a free surface located above the guiding element, and that a fourth screw receptacle is arranged on the guiding element immediately behind the free surface, preferably at a distance of less than 50 mm, particularly preferably at a distance of less than 30 mm. The soil is thus guided over the screw receptacle and the fastening screw held therein, or at least the contact pressure of the passing soil on the fastening screw is reduced, allowing for substantially reduced wear of the screw head.

BRIEF DESCRIPTION OF THE DRAWINGS

The present invention is explained in further detail below on the basis of an embodiment shown in the figures.

DETAILED DESCRIPTION OF THE INVENTION

Figure 1:
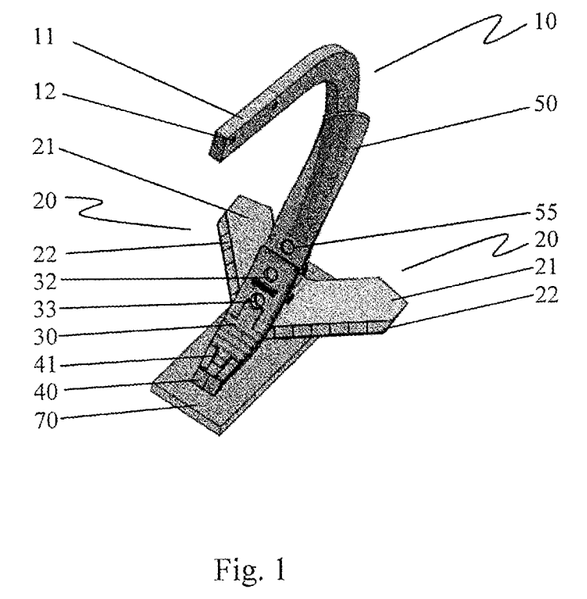
FIG. 1 shows a perspective front view of a cultivator share, having a blade tip and a guiding element.

FIG. 1 shows a perspective front view of a cultivator share, having a blade tip 30 and a guiding element 50. The cultivator share can be connected to a tool carrier, in particular, a tine 10 or tine carrier or plow beam or the like of an agricultural soil cultivation machine. For this purpose, the blade tip 30 has a screw receptacle 33 and a second screw receptacle 32, and the guiding element 50 has a fourth screw receptacle 55. The tine 10 has a fastening part 11 which is pierced by fastening bores 12. By means of these fastening bores 12, the tines 10 can be mounted on a device carrier. On the tine 10, two blade wings 20 are furthermore attached laterally to the blade tip 30. The blade wings 20 have a transverse carrier 21 to which lateral cutting elements 22, consisting of a hard material, are attached. Preferably, the lateral cutting elements 22 consist of a hard metal, which is firmly bonded, in particular soldered, to the transverse carrier 21. On the side facing the soil 70 to be cultivated, the blade tip 30 ends into two front cutting elements 40, to which two hard material elements 41 are associated on the side.

Figure 2:
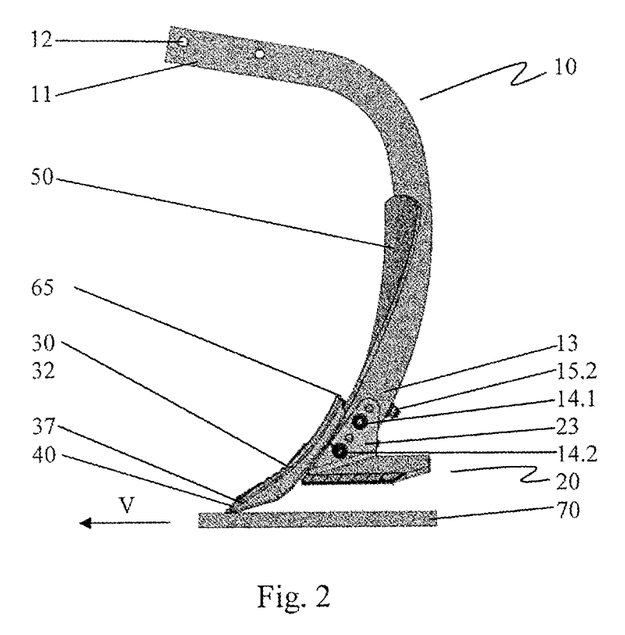
FIG. 2 shows the representation according to FIG. 1 in an enlarged side view.

FIG. 2 shows the representation according to FIG. 1 in an enlarged side view. The tine 10 has a carrier part 13 in a region facing away from the fastening part 11. The blade tip 30, the guiding element 50 and the lateral blade wings 20 are mounted on this carrier part 13. One angled portion 23 each, equipped with screw receptacles, is bent away from the transverse carriers 21 of the blade wings 20. By means of mounting screws 14.1, 14.2, which are inserted through the screw receptacles of the angled portion 23 as well as through the screw receptacles of the carrier part 13, the blade wings 20 can be attached to the carrier part 13 of the tine 10. Installed above the blade tip 30 is the guiding element 50 with an upper fastening screw 15, which is inserted through the fourth screw receptacle 55 of the guiding element 50 and a corresponding bore in the tine 10, as well with an associated upper screw nut 15.2 with the carrier part 13.

The cultivator share is pulled through the soil 70 to be cultivated by the agricultural soil cultivation machine along the illustrated tool feed direction V.

As can be seen in FIGS. 1 and 2, the guiding element 50 is formed by a flat-shaped or forged steel component. It is bent so as to form a helical deflecting surface. In some cases, straight deflecting surfaces are used as well. On this deflection surface, hard material elements, not illustrated, can be applied in the form of a deposit weld.

The front cutting elements 40 are firmly bonded to a cutter carrier 37 of the blade tip 30, for example, by soldering.

Figure 3:
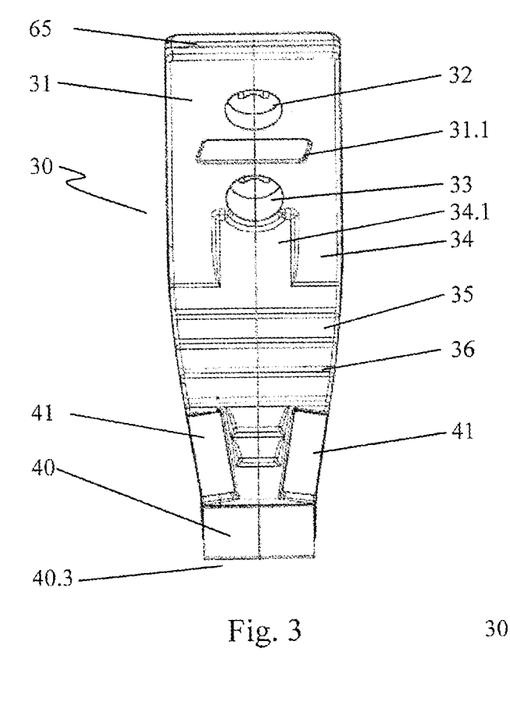
FIG. 3 shows the blade tip of the cultivator share according to FIG. 1 in an individual representation and in a view from the front.
Figure 4:
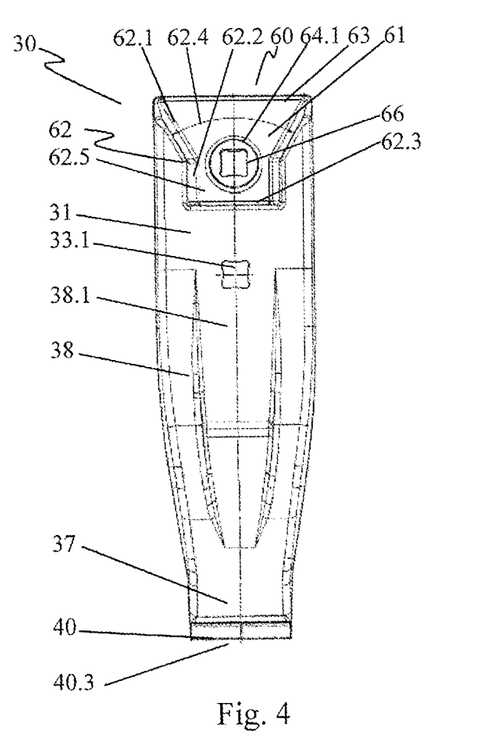
FIG. 4 shows the blade tip according to FIG. 3 in a rear view.

The blade tip 30 is located above the guiding element 50 with its end opposite of the front cutting elements 40 and forms a free surface 65 on its end face. By means of this free surface 65, passing soil is directed away from the fourth screw receptacle 55. A top screw head 15.1 of the upper fastening screw 15, which is held countersunk in the fourth screw receptacle 55 and is shown in FIGS. 3 and 4, is protected against the abrasive wear due to the soil. In order to be able to perform this function reliably, the height of the free surface 65 should be at least 8 mm. An optimum wear-protection effect is achieved with an overlap ≥12 mm.

FIG. 3 shows the blade tip 30 of the cultivator share according to FIG. 1 in an individual representation and in a view from the front. As shown in the drawings, the blade tip 30 has a base part 31, which is penetrated by the screw receptacle 33. Arranged above the screw receptacle 33 is a labeling field 31.1, adjacent to which is the second screw receptacle 32. A projection 34.1 is provided below the screw receptacle 33 that extends in the form of a deflector over a front-side deflecting surface 34 of the base part 31. In this manner, the projection 34.1 forms a skirt that protects a screw head arranged in the screw receptacle 33 against the abrasive attack by the passing soil. In front of the projection 34.1 in the tool feed direction V, the base part 31 has attachments 35 that project over the deflecting surface 34. In the present exemplary embodiment, the attachments 35 are rib-shaped and oriented transversely with respect to the tool feed direction V. Depressions 36 are formed between the individual attachments 35. During use of the tool, the soil may compress and settle into the region of the depressions 36. This forms a kind of natural wear protection on the deflecting surface 34.

In front of the attachments 35 in the tool feed direction V, the front cutting elements 40 are attached in the form of hard metal elements, which form a cutter 40.3 as the front edge of the blade tip 30. Behind the cutting elements 40 in the tool feed direction V, the hard material elements 41 are applied on the edge regions of the base part 31, which are subjected to particularly high wear. In the present case, hard metal plates are soldered to the base portion 31 as the hard material elements 41. However, it is also conceivable to use an armor welding or the like.

On the end face opposite the cutting elements 40, the blade tip 30 terminates in the free surface 65.

FIG. 4 shows the blade tip 30 according to FIG. 3 in a rear view. At the lower end of the blade tip 30, the cutter 40.3 of the front cutting elements 40 extends over the cutter carrier 37 as the lower region of the blade tip 30. In the region above the cutter carrier 37 projections 38 are molded onto the base part 31. The projections 38 are formed rib-like and arranged in the region of the longitudinal edges of the base part 31. The projections 38 are arranged spaced apart from each other so that a depression 38.1 is formed between the projections 38. On the end of the projections 38 facing away from the cutter carrier 37, in the region of the depression 38.1, an opening of the screw receptacle 33 is arranged, which is designed as a first screw lock 38.1. The first screw lock 33.1 has a shape that differs from a round cross-section so that an inserted lower fastening screw 17, shown in FIG. 5, can be secured against turning in the first screw lock 33.1 by a molded-on second locking attachment 17.3. In the illustrated embodiment, the first screw lock 33.1 has an at least approximately rectangular shape with the corners being rounded and the side surfaces being formed concavely inward. The second locking attachment 17.3, which is arranged below a lower screw head 17.1 of the lower fastening screw 17, shown in FIG. 5, has an outer contour corresponding thereto, so that it is held in the first screw lock 33.1 with a predetermined clearance.

As FIG. 4 further shows, the blade tip 30 has a receptacle 60 on the end facing away from the cutter carrier 37. The receptacle 60 may also be referred to as the plug receptacle 60. The receptacle 60 is pocket-shaped and molded into the back side of the blade tip 30. It has a covering portion 61. On the side, insertion chamfers 62.1 adjoin the covering portion 61. The insertion chamfers 62.1 are placed in a V-shape with respect to each other, with an opening angle 62.4, which is 60.degree. in the present exemplary embodiment. In the region below the insertion chamfers 62.1, blocking pieces 62.2 are arranged spaced apart. The two blocking pieces 62.2 are integrally connected to each other via a connecting piece 62.3 of the receptacle 60. The insertion chamfers 62.1, the blocking pieces 62.2, and the connecting piece 62.3 form side walls 62 of the receptacle 60, which rise from the covering portion 61. On the front face, the receptacle 60 is opened by a receptacle opening 63. A release groove 62.5 is provided in the covering portion 61 along the insertion chamfers 62.1, the blocking pieces 62.2, and the connecting piece 62.3. The release groove 62.5 forms a rounded transition from the covering portion 61 to the side walls 62, reducing tension peaks applied by external forces, compared to a sharp edging. The release groove 62.5 also serves to receive a burr, as may be present for manufacturing reasons at the edges on a plug projection 51 of the guiding element 50, held in the receptacle 60 and shown in FIGS. 5, 6, and 7.

Between the blocking pieces 62.2, a first form-fitting element 64.1 is molded on in the form of a spherical attachment on the covering portion 61, otherwise formed as a flat surface. The first form-fitting element 64.1 projects into the receptacle 60. In order to obtain a compact design with at the same time sufficient mechanical resistance of the connection between the blade tip 30 and the guiding element 50, in particular, with respect to forces along the insertion direction of the guiding element 50 into the receptacle 60, the diameter of the at least one first form locking element 64.1, designed as a ball attachment or as a ball receptacle, at the transition into the covering portion 61 is in a range between 10 mm and 40 mm, preferably in a range between 22 mm and 26 mm, particularly preferably in a range between 23.5 mm and 24.5 mm. An opening of the second screw receptacle 32, shown in FIG. 3, is arranged in the center of the ball attachment, serving as a first form-fitting element 64.1. The opening is designed in the form of a screw lock 66. The screw lock 66 serves to fix a fastening screw 16, inserted in the second screw receptacle 32 as shown in FIGS. 5 and 6, which, as the previously described lower fastening screw 17, has a locking attachment 16.3 is below a screw head 16.1, with the fastening screw 16 in the screw lock 66 being rotationally fixed.

Figure 5:
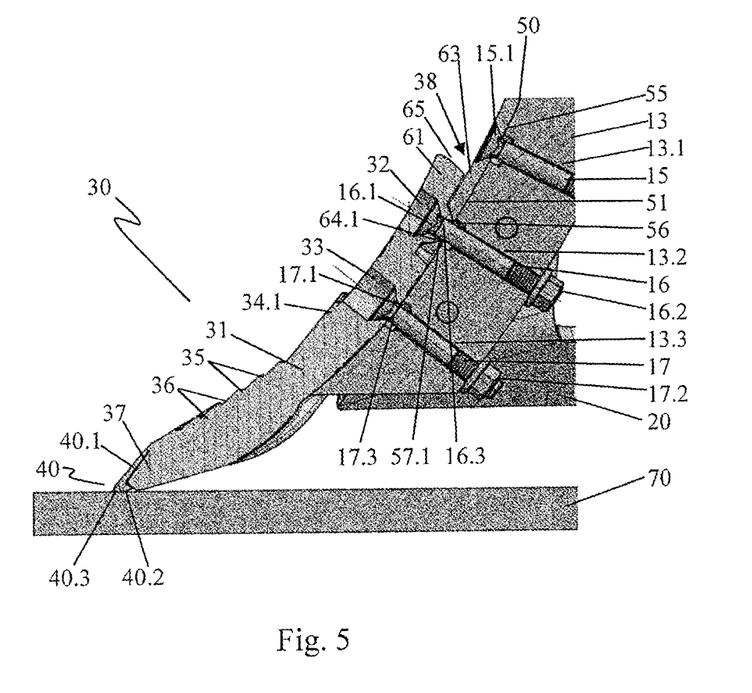
FIG. 5 shows the blade tip mounted on a tine in a laterally enlarged sectional view.
Figure 6:
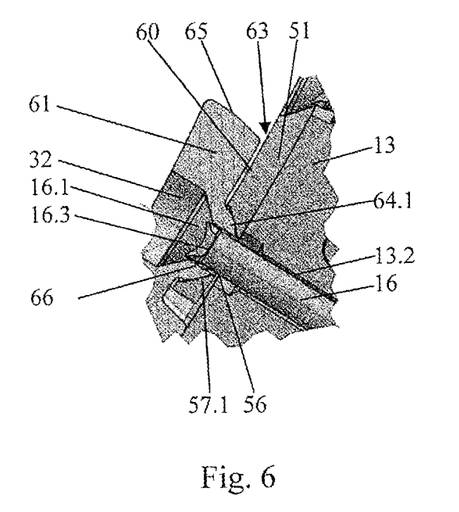
FIG. 6 shows the connection between the blade tip, a guiding element, and the tine in a laterally further enlarged sectional view.

FIG. 5 shows the blade tip 30 mounted on the tine 10 in the region of the carrier part 13 in a lateral enlarged sectional view.

The carrier part 13 of the tine has an upper bore 13.1, a central bore 13.2, and a lower bore 13.3 for fastening the guiding element 50 and the blade tip 30. The upper bore 13.1 is arranged flush with the fourth screw receptacle 55, arranged in the guiding element 30, so that the upper fastening screw 15 can be inserted through the screw receptacle 55 and the bore 13.1. The upper screw head 15.1 of the upper fastening screw 15 is designed as a countersunk head and fits into the fourth screw receptacle 55 designed as a countersunk bore such that the surface of the upper screw head 15.1 is arranged flush or recessed with respect to the surface of the guiding element 50. The upper screw head 15.1 is thus protected against abrasive wear caused by the passing soil.

The plug attachment 51 of the guiding element 50 is inserted into the receptacle 60 of the blade tip 30 through the receptacle opening 63 and is held between the covering portion 61 and the carrier part 13 of the tine 10. Here the plug attachment 51 has a first form-fitting counter element 57.1, into which the first form-fitting element 64.1 of the blade tip 30 engages. The fastening screw 16 is inserted centrally through the first form-fitting element 64.1 and the first form-fitting counter element 57.1 as well as through the central bore 13.2 of the carrier part 13, which is flush therewith, and is held on the back side of the carrier part 13 by a screw nut 16.2. It thus connects the blade tip 30 and the guiding element 50 with the carrier part 13. The screw head 16.1 of the fastening screw 16 is arranged countersunk in second screw receptacle 32, designed as a blind hole. The soil guided over the deflecting surface 34 thus does not scrape directly over the screw head 16.1, so that it is protected against abrasive wear.

The lower bore 13.3 of the carrier part 13 is arranged flush with the screw receptacle 33 of the blade tip 30. The lower fastening screw 17 is inserted through the screw receptacle 33 and the bore 13.3 and bolted on the back side of the carrier part 13 with a lower screw nut 17.2. The lower screw head 17.1 of the lower fastening screw 17 is held countersunk in the screw receptacle 33 so that it is protected against abrasive wear as well.

The cutting elements 40 in the form of hard metal elements are fastened to the cutter carrier 37. The cutting elements 40 have a flat-shaped mounting portion 40.1 and an attachment piece 40.2, integrally molded thereon and projecting against the tool feed direction V. The cutter 40.3 is formed in the region of the attachment piece 40.2. The cutting elements 40 are attached to the cutter carrier 37 such that the free terminating edge of the cutter carrier 37 is at least partially surrounded by the attachment pieces 40 of the cutting elements 40.2. In this manner, the free end of the cutter carrier 37 is protected against wear.

FIG. 6 shows the connection between the blade tip 30, the guiding element 50, and the tine 10 in the region of the second screw receptacle 32 in a laterally further enlarged sectional view.

The first form-fitting element 64.1, designed as a ball attachment, engages with the first form-fitting counter element 57.1 of the guiding element 50. The ball attachment is centered by means of the inclined surfaces of the first form-fitting counter element 57.1 such that the second screw receptacle 32 and a third screw receptacle 56, arranged in the center of the first form-fitting counter element 57.1, are aligned flush with one another.

The fastening screw 16, pulls together the blade tip 30, the guiding element 15, and the carrier part 13 of the tine 10. As a result, the blade tip 30 and the guiding element 15 are form-fittingly connected with each other by the first form-fitting element 64.1 and the first form-fitting counter element 57.1.

The fastening screw 16 with its locking attachment 16.3 is secured against rotation in the screw lock 66 of the second screw receptacle 32. The screw nut 16.2 may thus be screwed and tightened onto the fastening screw 16 without needing to apply a tool in a corresponding tool receptacle on the screw head 16.1. The screw lock 66 is arranged in the first form-fitting element 64.1. By means of the first form-fitting element 64.1 projecting into the receptacle 60, the support of the screw head 16.1 can be provided more deeply in the second screw receptacle 32 than in the case of a covering portion 61 that is continuously planar on the side of the receptacle 60. The screw head 16.1 is thus more deeply countersunk in the second screw receptacle 32 and thus better protected against abrasion.

Figure 7:
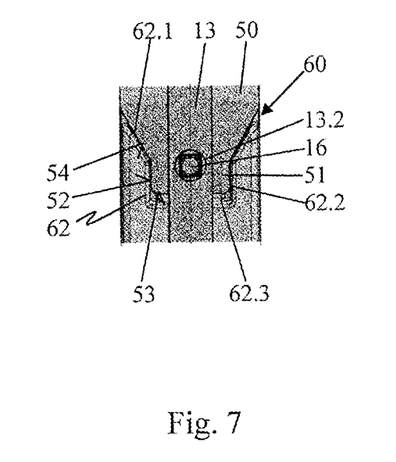
FIG. 7 shows a sectional view of the tines with the mounted blade tip and the guiding element in a rear view.

FIG. 7 shows a sectional view of the tine 10 with the mounted blade tip 30 and the guiding element 50 in a rear view.

The plug attachment 51 has two guide surfaces 54 which are set in a V-shape at an angle to each other. They transition into the side parts 52. The side parts 52 are arranged in the region of an end 53 of the plug attachment 51.

For mounting the blade tip 30, it is pushed onto the plug attachment 51 of the guiding element 50 with its receptacle 60. As can be seen in FIG. 7, the plug attachment 51 of the guiding element 50 can be threaded in at the insertion chamfers 62.1 during this joining movement to enable targeted mounting. After the plug attachment 51 has passed the insertion chamfers 62.1, the end 53 of the plug attachment 51 glides between the two blocking pieces 62.2. The dimensional relationship is selected such that the blocking pieces 62.2 are laterally assigned to the side parts 52. As a result, the blade tip 30 can be fixed flush to the blocking pieces 62.2, transversely to the tool feed direction V, taking into account a minimum, technically required clearance. To ensure a defined fit, the connecting piece 62.3 and the end 53 of the plug attachment 51 are then spaced apart. Furthermore, the insertion chamfers 62.1 are also arranged at a small distance from the guiding chamfers 54. At the same time, the first form-fitting element 64.1 engages with the first form-fitting counter element 57.1, as shown in FIGS. 5 and 6.

After the blade tip 30 with its receptacle 60 has been fixed on the plug attachment 51 of the guiding element 50 and the first form-fitting element 64.1 engages with the first form-fitting counter element 57.1, the screw receptacles 32, 33 of the blade tip 30 are flush with the center or lower bore 13.2, 13.3 of the tine 10. Furthermore, the second screw receptacle 32 is aligned flush with the third screw receptacle 56 of the guiding element 50. The fastening screws 16, 17 can now be inserted through the screw receptacles (32, 33, 56) and holes (13.2, 13.3), aligned flush to one another, and the blade tip 30 can be fixed to the tine 10. The non-rotatable assignment of the blade tip 30 to the tine 10 is ensured by means of the form-fitting blockage between the plug attachment 51 and the receptacle 60.

Figure 8:
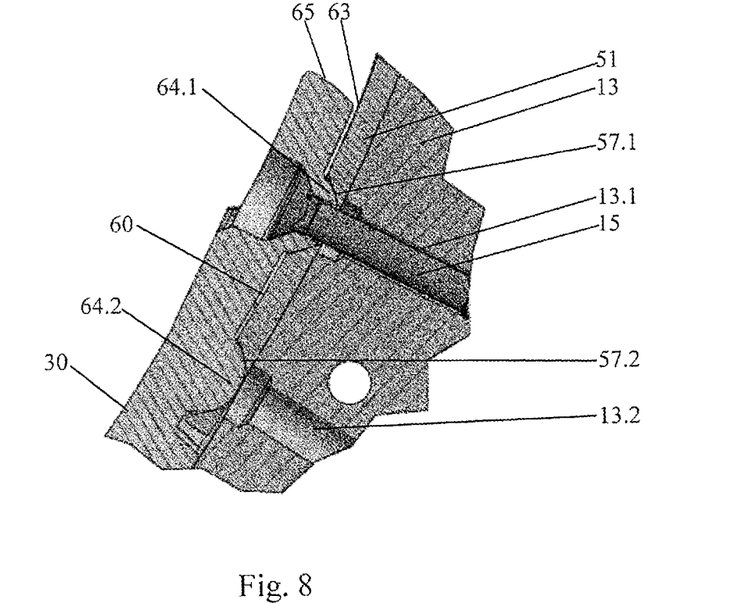
FIG. 8 shows the blade tip mounted on a tine in a laterally enlarged sectional view with an elongated receptacle.

FIG. 8 shows the blade tip 30 mounted on the tine 10 in a lateral enlarged sectional view with an elongated receptacle 60. The covering portion 61 and the side walls 62, not shown, of the receptacle 60 here are elongated far enough in the direction of the guiding element 50 so that the upper bore 13.1 is covered. The first form-fitting element 64.1 and the first form-fitting counter element 57.1 are now arranged opposite to the upper bore 13.1 and penetrated by the upper fastening screw 15. To this end, the upper fastening screw 15 with its upper screw head 15.1 is held in the second screw receptacle 32, which is opposite the upper bore 13.1 due to the elongated covering portion 61. A form-fitting connection is thus formed between the first form-fitting element 64.1 and the first form-fitting counter element 57.1, as described with reference to FIG. 6. The upper fastening screw 15 is protected against abrasive wear by its countersunk position in the second screw receptacle 32.

Additionally, opposite the center hole 13.2 a second form-fitting element 64.2 is provided on the covering portion 61 and a second form-fitting counter element 57.2 is provided on the plug attachment 51 of the guiding element 50. The second form-fitting element 64.2 here is designed as a ball attachment, corresponding to the first form-fitting element 64.1, which engages with the second form-fitting counter element 57.2. The second form-fitting counter element 57.2 is designed as a circular opening of the plug attachment 51 with inclined surfaces, so that the ball attachment is centered therein during assembly. Due to the thus formed second form-fitting connection, the center screw connection and the fastening screw 16 with the associated screw nut 16.2 can be omitted.

Figure 9:
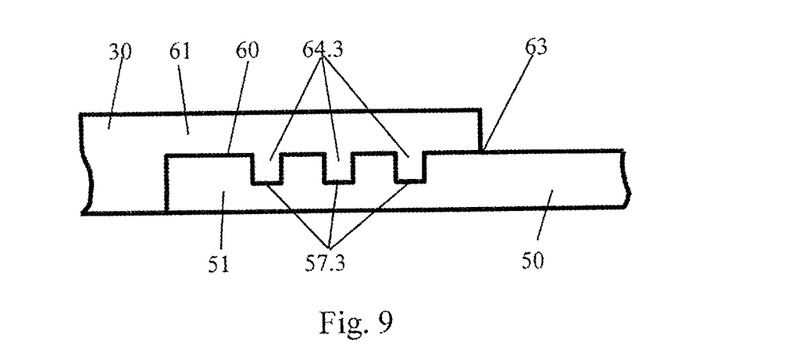
FIGS. 9-10 show further form-fitting connections between the blade tip and the guiding element in schematic lateral sectional views.
Figure 10:
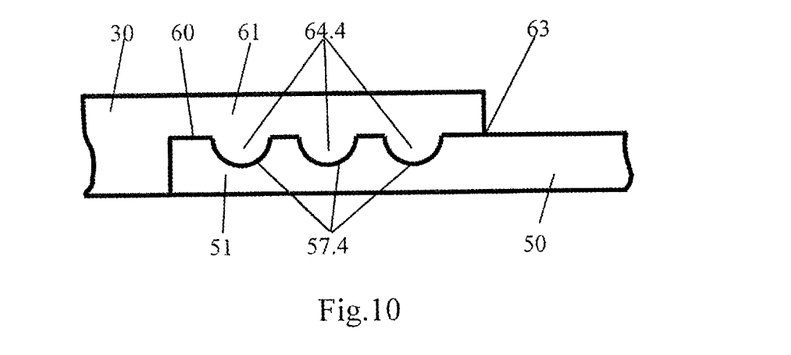

FIGS. 9-10 show further possible form-fitting connections between the blade tip 30 and the guiding element 50 in schematic lateral sectional views. In this case, the form-fitting connection is established between the covering portion 61 and the plug attachment 51. For simplified illustration, screw connections and the carrier part 13 of the tine 10 are not shown.

In FIG. 9, the covering portion 61 has three third form-fitting elements 64.3 in the form of rib-shaped attachments with a rectangular profile, which extend transversely with respect to the blade tip 30. These engage with three groove-shaped receptacles, which are aligned transversely to the longitudinal extension of the plug attachment 51 and form third form-fitting counter elements 57.3. The guiding element 51 and the blade tip 30 are thus fixed relative to one another by means of the form-fitting connection between the third form-fitting elements 64.3 and the third form-fitting counter elements 57.3.

In FIG. 10, the covering portion 61 has three fourth form-fitting elements 64.4 in the form of ball sections arranged along the central longitudinal axis of the blade tip 30. The fourth form-fitting elements 64.4 engage with the fourth form-fitting counter elements 57.4, which are incorporated into the surface of the plug attachment 51 as concave recesses.

Figure 11:
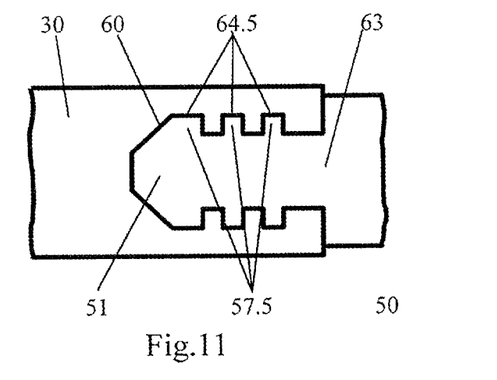
FIGS. 11-13 show further form-fitting connections between the blade tip and the guiding element in schematic rear views.
Figure 12:
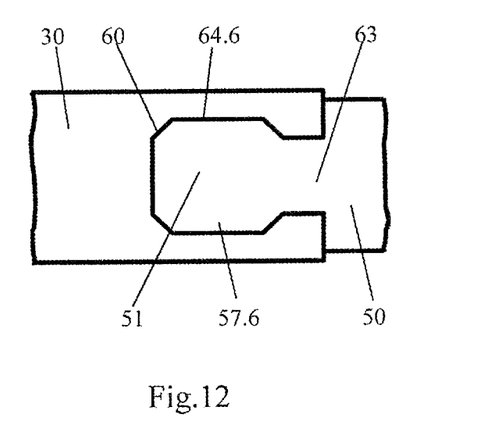
Figure 13:
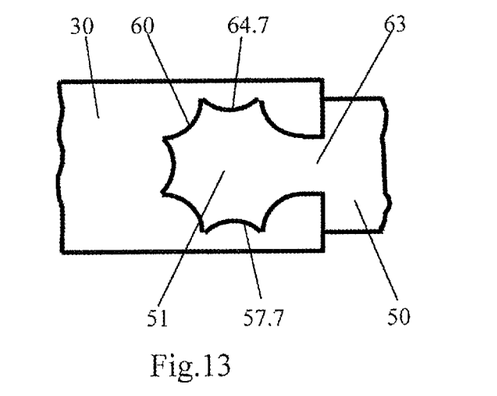

FIGS. 11 to 13 show a further form-fitting connection between the blade tip 30 and the guiding element 50 in schematic rear views.

In FIG. 11, fifth form-fitting elements are formed as recesses 64.5 in the side walls 62 of the receptacle 60. Correspondingly formed fifth form-fitting counter elements 57.5 engage with this recess. At the end, the plug attachment 51 has a widened region, which accordingly engages with a widened region of the receptacle 60.

In FIG. 12, the form-fitting connection between the blade tip 30 and the plug attachment 51 of the guiding element 50 is formed by a region of the plug attachment 51, which is widened relative to the width of the receptacle opening 63, and a correspondingly widened region of the receptacle 60. The widened region of the receptacle 60 forms the sixth form-fitting element 64.7 and the widened region of the plug attachment 51 forms the sixth form-fitting counter element 64.6.

According to FIG. 13, a seventh form-fitting counter element 57.7 is formed as a region of the plug attachment 51, which is widened in a star-shaped manner relative to the receptacle opening 63 and which is inserted into a correspondingly shaped seventh form-fitting element 64.7.

For mounting, the guiding element 50 and the blade tip 30, the blade tip 30 with its receptacle 60 is pushed onto the plug attachment 51 of the guiding element 50 in the various variants of the form-fitting connections. Here, the plug attachment 51 is inserted through the receptacle opening 63 of the receptacle 60 and the form-fitting elements 64.1, 64.2, 64.3, 64.4, 64.5, 64.6, 64.7, 19, 58 and the associated form-fitting counter elements 57.1, 57.2, 57.3, 57.4, 57.5, 57.6, 57.7 57.8, 18, 39 engage with one another. In this position, the blade tip 30 and the guiding element 50 are bolted with the tine 10. The form-fitting connections thereby reliably prevent the guiding element 50 and the blade tip 30 from being pulled apart along the direction of their longitudinal extension.

Figure 14:
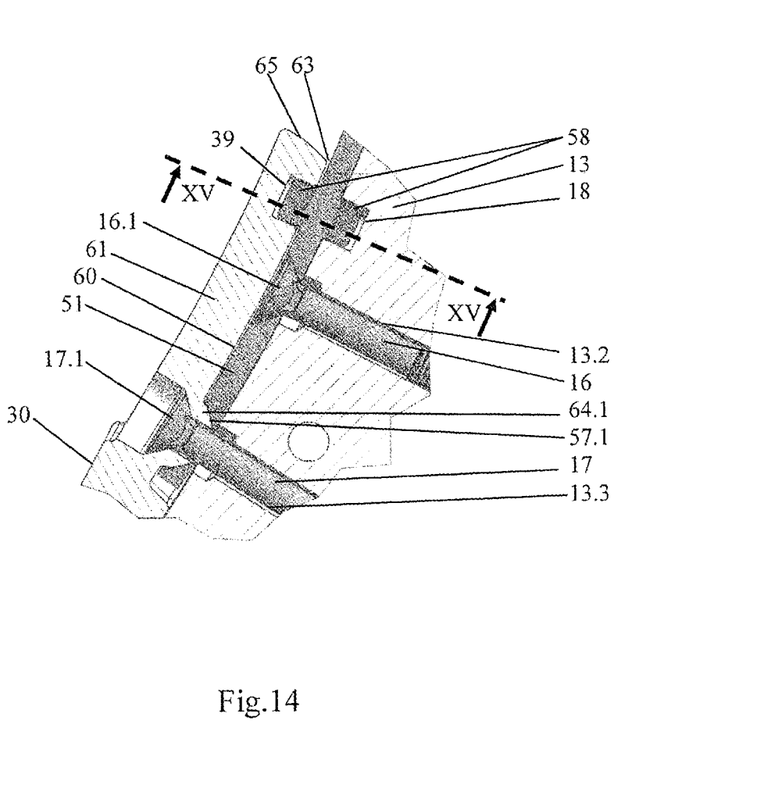
FIG. 14 shows the blade tip mounted on the tine with a form-fitting connection between the guiding element, the blade tip, and the tine in a laterally enlarged sectional view.

FIG. 14 shows the blade tip 30 mounted on the tine 10 with a form-fitting connection between the guiding element 50, the blade tip 30, and the tine 10 in a lateral enlarged sectional view.

A first form-fitting connection is formed between the receptacle 60 and the plug attachment 51 in the form of the first form-fitting element 64.1, designed as a spherical surface and already described in FIG. 5, which engages with the first form-fitting counter element 57.1 in the plug attachment 51. The first form-fitting element 64.1 is pressed into the first form-fitting counter element 57.1 by the lower fastening screw 17. The screw head 16.1 of the fastening screw 16 is countersunk and held covered in the plug connection 51 of the guiding element 50 by means of the covering portion 61 of the receptacle 60. Between the fastening screw 16 and the receptacle opening 63 of the receptacle 60, a tenth form-fitting element 57.8 is formed on the plug attachment 51 in the form of a trunnion. The trunnion here protrudes out of the plane of the plug attachment 51 both in the direction of the covering portion 61 as well as opposite in the direction of the carrier part 13 of the tine 10. The tenth form-fitting element 57.8 thereby engages with an eighth form-fitting counter element 39, formed as a recess in the covering portion 61, as well as into a ninth form closure element 18, formed as a recess into the carrier part 13. Thus, the eighth form-fitting element 58 forms a form-fitting connection from the guiding element 50 in the direction of both the blade tip 30 and the tine 10.

Figure 15:
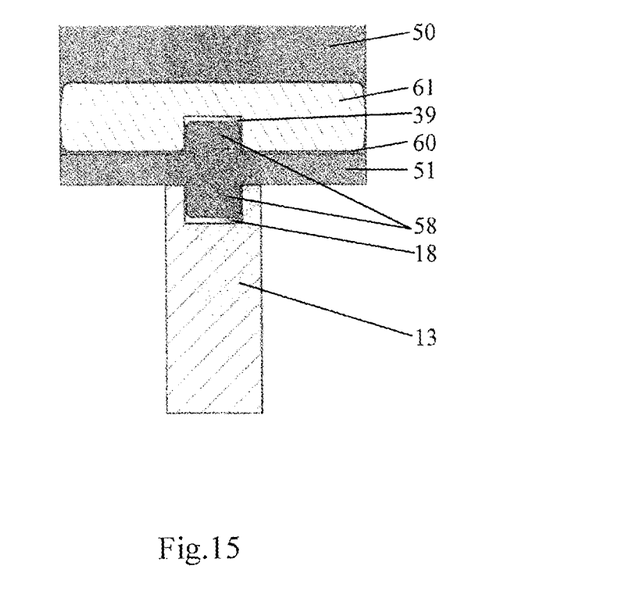
FIG. 15 shows the form-fitting connection shown in FIG. 14 in a sectional view, transverse to the tool feed direction of the blade tip.

FIG. 15 shows the form-fitting connection of the blade tip 30, shown in FIG. 14 in a sectional view, transverse to the tool feed direction V, along the intersecting line marked with XV in FIG. 14.

The trunnion of the eighth form-fitting element 58, which is molded on both sides on the plug attachment 51, engages with the recesses of the eighth form-fitting element 39 at the covering portion 61 of the receptacle 60 and with the ninth form-fitting element 19 at the carrier part 13 of the tine 10. Thus, a form-fitting connection between the guiding element 50, the tine 10, and the blade tip 30 is formed, both transversely and longitudinally with respect to the longitudinal extension of the tool combination.

Figure 16:
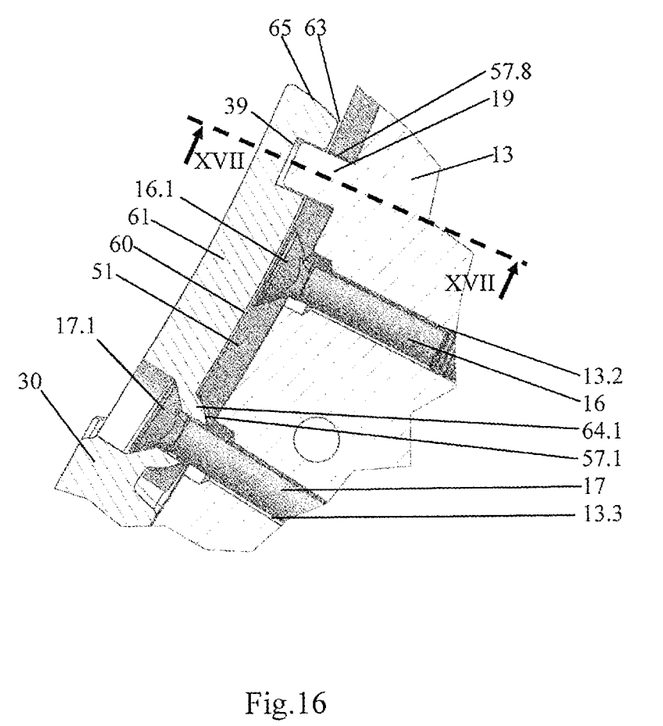
FIG. 16 shows the blade tip mounted on the tine with a further form-fitting connection between the guiding element, the blade tip, and the tine in a laterally enlarged sectional view.

FIG. 16 shows the blade tip 30 mounted on the tine 10 with another form-fitting connection between the guiding element 50, the blade tip 30, and the tine 10 in a lateral enlarged sectional view. The representation substantially corresponds to the representation shown in FIG. 14. Unlike in the above, the carrier part 13 of the tine 10 has a ninth form-fitting element 19, which is designed as a trunnion oriented in the direction towards the plug attachment 51 of the guiding element 50 and towards the covering portion 61 of the receptacle 60 of the blade tip 30. The ninth form-fitting element 19 engages with a tenth form-fitting counter element 57.8, designed as an opening in the plug attachment 51, and with an eight form-fitting counter element 39, designed as a recess or opening in the covering portion 61. Here, too, a form-fitting connection is established between the blade tip 30, the tine 10, and the guiding element 50. Of course, the form-fitting element 19 may also be molded or attached to the blade tip 30 instead. It then engages with the opening, formed as the tenth form-fitting element 57.8, and the form-fitting counter element of the tine 10, formed as a recess or opening.

Figure 17:
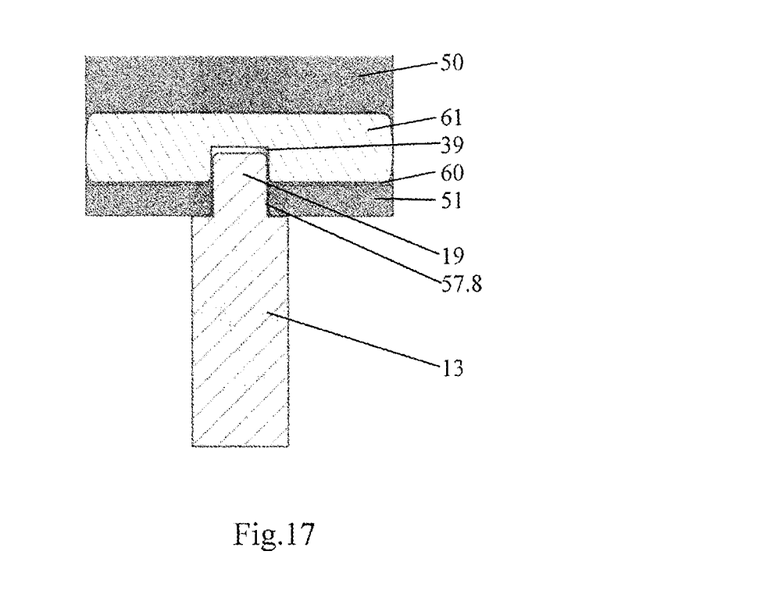
FIG. 17 shows the further form-fitting connection shown in FIG. 16 in a sectional view, transverse to the tool feed direction of the blade tip.

FIG. 17 shows the further form-fitting connection of the blade tip 30, shown in FIG. 16 in a sectional view, transverse to the tool feed direction V, along the intersecting line marked with XVII in FIG. 16. The ninth form-fitting counter element 19, designed as a trunnion, is integrally connected to the carrier part 13 of the tine 10. It protrudes into the tenth form-fitting counter element 57.8, designed as an opening, of the plug attachment 51 and into the eighth form-fitting counter element 39, designed as a recess in the covering portion 61 of the receptacle 60.

By means of continuous form-fitting connections, shown in FIGS. 14 to 17, the tine 10, the guiding element 50, and the blade tip 30 are connected to one another in a form-fitting manner, and thus resiliently. At the same time, the continuous form-fitting connection is achieved by the fact that the components are accurately aligned with each other, facilitating mounting of the tool combination.

The invention claimed is:

1. A tool combination for an agricultural soil cultivation machine, the agricultural soil cultivation machine including a tine including a carrier part, the tool combination comprising:

a blade tip including a base part and a cutter attached to the base part, the base part including:

a screw receptacle defined in the base part for fastening the base part to the carrier part of the tine;

a plug receptacle defined in a back side of the base part, the plug receptacle being laterally enclosed by two side walls spaced apart from each other in a first direction transverse to a tool feed direction, and the plug receptacle being open to an end of the base part opposite from the cutter, such that the plug receptacle is covered in the tool feed direction by a covering portion of the base part; and at least one form-fitting element defined on the base part; and a guiding element including a plug projection receivable in the plug receptacle between the covering portion of the base part and the carrier part of the tine, the plug projection also being receivable between the two sidewalls, the guiding element further including at least one form-fitting counter element defined on the plug projection, the guiding element extending away from the plug projection out of the plug receptacle and beyond the base part in a direction away from the cutter to cover a portion of the carrier part of the tine and to guide soil cut by the blade tip; and wherein the at least one form-fitting element is configured to form a form-fitting connection with the at least one form-fitting counter element such that movement of the plug projection out of the plug receptacle is prevented.

2. The tool combination of claim 1, wherein:
the base part further includes two insertion chamfers spaced apart from each other and transitioning into the two side walls of the plug receptacle, the two insertion chamfers extending from the end of the base part opposite from the cutter to the two side walls of the plug receptacle.

3. The tool combination of claim 2, wherein:
the two insertion chamfers define an opening angle in a range between 50 degrees and 70 degrees.

4. The tool combination of claim 2, wherein:
the plug projection includes two guide surfaces set in a V-shape at an angle to each other, the guide surfaces being receivable between the two insertion chamfers.

5. The tool combination of claim 1, wherein:
the at least one form-fitting element is arranged at least partially between the two side walls and the two side walls are spaced apart by a distance in a range between 40 mm and 50 mm.

6. The tool combination of claim 1, wherein:
the at least one form-fitting element is defined on at least one of a surface delimiting the covering portion or on at least one of the side walls.

7. The tool combination of claim 1, wherein:
the at least one form-fitting element includes at least one attachment protruding from the covering portion or at least one recess formed in the covering portion.

8. The tool combination of claim 1, wherein:
the at least one form-fitting element is formed by at least one region of the plug receptacle tapering towards an opening of the plug receptacle.

9. The tool combination of claim 1, wherein:
the at least one form-fitting element includes one of a centering attachment, a centering receptacle, a ball attachment, or a ball receptacle.

10. The tool combination of claim 1, wherein:
the covering portion has a second screw receptacle defined through the covering portion and through the at least one form-fitting element.

11. The tool combination of claim 10, wherein:
the second screw receptacle includes an end-side opening facing away from plug receptacle, the end-side opening being configured to receive a head of a fastening screw countersunk therein.

12. The tool combination of claim 10, wherein:
the second screw receptacle includes a substantially rectangular shape opening defining a screw lock for non-rotatably fixing in place a fastening screw received through the second screw receptacle.

13. The tool combination of claim 1, wherein:
the at least one form-fitting element includes at least one region of the plug receptacle tapering, and the at least one form-fitting counter element includes at least one region of the plug projection tapering to fit in the one region of the plug receptacle.

14. The tool combination of claim 1, wherein:
the guiding element is connected to the tine and a second form-fitting connection is provided in a boundary surface between the guiding element and the tine.

15. The tool combination of claim 1, wherein:
the guiding element is connected to the tine and the base part of the blade tip includes a form-fitting element proximate the plug receptacle engaging with a form-fitting counter element on the plug projection and with a form-fitting counter element of the tine.

16. The tool combination of claim 1, wherein:
the guiding element is connected to the tine and the plug projection includes a form-fitting element engaging with a form-fitting counter element of the base part of the blade tip and with a form-fitting counter element of the tine.

17. The tool combination of claim 1, wherein:
the guiding element is connected to the tine and the tine includes a form-fitting element engaging with a form-fitting counter element of the plug projection and with a form-fitting counter element of the base part of the blade tip.

18. The tool combination of claim 1, wherein:
the covering portion has a second screw receptacle defined through the covering portion and through the at least one form-fitting element; and
the guiding element has a third screw receptacle defined therethrough and through the at least one form-fitting counter element.

19. The tool combination of claim 1, wherein:
the covering portion forms a free surface positioned above the guiding element on the end of the base part opposite from the cutter; and
a further screw receptacle is defined through the guiding element, the further screw receptacle being spaced from the free surface by a distance of less than 50 mm.

20. The tool combination of claim 1, wherein:
the covering portion includes a projection projecting above a front surface of the base part intermediate the plug receptacle and the cutter, the projection defining a protective skirt around at least a portion of the screw receptacle.

* * * * *